United States Patent Office 2,998,222
Patented Aug. 29, 1961

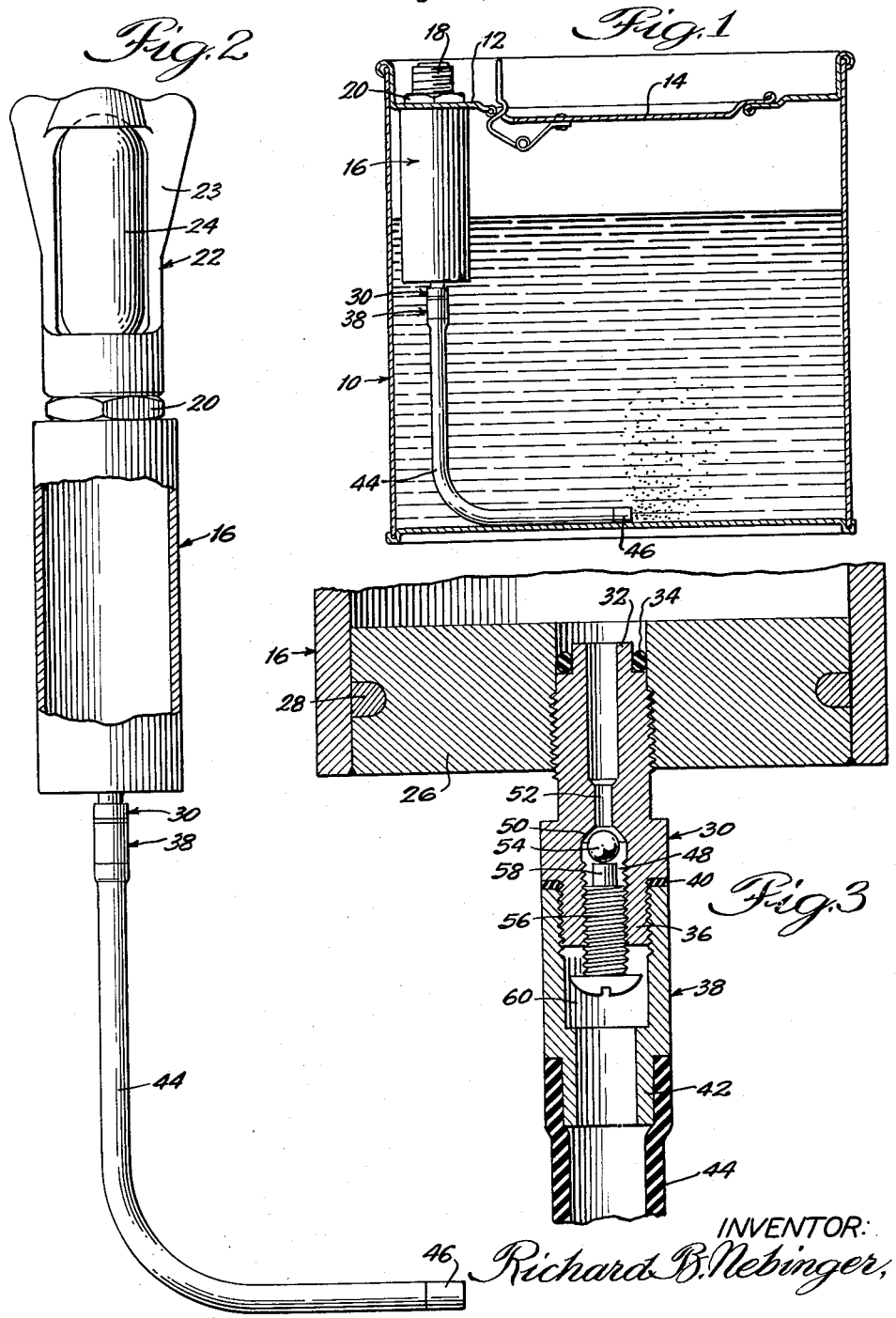

2,998,222
OXYGEN-METERING MEANS FOR BAIT BUCKET AERATOR
Richard B. Nebinger, St. Louis, Mo., assignor to Knapp-Monarch Company, St. Louis, Mo., a corporation of Delaware
Filed Aug. 10, 1959, Ser. No. 832,520
1 Claim. (Cl. 251—121)

This invention relates to an oxygen-metering device for an oxygen dispenser for bait buckets and the like, which contains water and live bait, such as minnows or shrimp, therein. Such bait gradually depletes the oxygen in the water which, if not replenished, results in the death of the bait. This invention provides an improved and convenient oxygen-metering means for use with an oxygen dispensing means for replenishing the water in a bait bucket with oxygen.

Devices of this general type for replenishing oxygen in bait buckets are not broadly new, but it is critical with all such devices that an efficient pressure-reducing and oxygen-metering means be provided therein, because oxygen-replenishing systems generally include a supply of oxygen at a relatively high pressure, and the oxygen is to be dispensed into the water in the bait bucket at a relatively low pressure. Obviously, the pressure-reducing and metering-means for the oxygen must have very fine orifices to effect efficient pressure reduction and metering of the oxygen from a relatively high pressure condition at the supply end to a relatively low pressure condition at discharge into the water. Furthermore, such pressure-reducing and oxygen-metering means are plagued by the problem of becoming clogged by debris that may be borne and moved along by the high pressure oxygen, and it is frequently found that in use in the field, such devices rapidly become plugged and useless.

Accordingly, one of the objects of this invention is to provide an improved pressure-reducing and oxygen-metering device for a bait bucket aerator, which device is adapted to receive oxygen at a relatively high pressure and is adapted to deliver oxygen therefrom at a relatively low pressure to water to be aerated, and which device permits of simple disassembly and re-assembly in the field, for the purpose of cleaning of obstructions and debris from the gas-flow passageways of the device.

Another object of this invention is to provide a pressure-reducing and oxygen-metering device for a bait bucket aerator or the like, which device may be readily disassembled for the purpose of cleaning, and which device is equipped with very simple means for re-setting of the pressure-reducing means to a point wherein the flow of oxygen from the device is regulated to an amount as desired.

Further objects and advantages of this invention will become apparent as the following description proceeds and the features of novelty which characterize this invention will be pointed out with particularity in the claim annexed to and forming part of this specification.

A preferred embodiment of the invention is shown in the accompanying drawings, in which:

FIGURE 1 is a vertical sectional view through one form of bait bucket which is equipped with one form of oxygen dispenser, or aerator, of the type herein disclosed.

FIGURE 2 is an enlarged elevation view, with parts broken away, of the oxygen dispenser of FIGURE 1 which is equipped with the improved pressure-reducing and oxygen-metering device of this application; and FIGURE 3 is an enlarged, vertical, axial, cross-sectional view showing the details of the improved pressure-reducing and oxygen-metering device which is disclosed herein Referring now to the drawings, there is shown a bait bucket, generally indicated at 10, having a top wall 12 provided with a selectively openable lid 14. In the specific embodiment shown herein, one form of an oxygen-supplying system for the water in the bait bucket may be secured to the top wall 12 of the bait bucket 10, as shown in FIG. 1. Referring more particularly to the oxygen-supplying means, said oxygen-supplying means includes a hollow, pressure-resistant, cylinder 16 which is adapted to receive therein oxygen under relatively high pressure. The cylinder 16 has an upwardly extending, threaded, tubular stud 18 which carries a lock-nut 20 thereon. The arrangement is such that the cylinder 16 and the lock-nut 20 may be disposed on opposite sides of the top 12, so as to clamp the oxygen-supplying means to the top wall 12 of the bait bucket 10. When clamped in position, the stud 18 extends through top 12 and above nut 20, as best seen in FIG. 1. A disposable source of supply of oxygen under pressure, and including a connector 23 screw-threaded to stud 18, generally indicated at 22, is adapted to be connected to cylinder 16 to deliver oxygen thereto. The source of supply may include a pressurized bulb 24 which, when pierced, delivers high-pressure oxygen through stud 18 to the high-pressure cylinder 16.

The bottom wall of cylinder 16 is provided with a closure wall 26 equipped with gasket means 28 located between wall 26 and the cylindrical wall of cylinder 16 for preventing loss of oxygen from the cylinder 16. A first annular coupling member, generally indicated at 30, is threadably connected to a central bore in wall 26 and provides a connection to the relatively-high-pressure oxygen supply within the cylinder 16. The upper end of the first annular coupling member 30 is provided with a reduced sleeve, or stud, 32 and a sealing gasket, in the form of an O-ring 34, is provided between sleeve 32 and the wall 26. The lower end of the first annular coupling member 30 is provided with an exteriorly threaded sleeve portion 36. A second annular coupling member, generally indicated at 38, is threadably coupled to sleeve 36, and a washer-type gasket means 40 is provided between the coupling members 30 and 38 to effect sealing and prevent loss of oxygen therebetween.

The lower end of the second annular coupling member 38 is provided with a tubular sleeve portion 42 on to which may be press-fit one end of a flexible tube 44 which leads to a foraminous plug 46 through which oxygen may be efficiently diffused into the water contained within the bait bucket 10.

The first annular coupling member 30 is provided with an axial bore therethrough, the lower portion of which bore is radially enlarged, as indicated at 48, and a segment of said enlarged bore 48 is threaded. The upper end of enlarged bore portion 48 merges with a frusto-conical valve seat 50 which surrounds a constricted bore portion 52 located immediately upstream of said valve seat 50. A valving ball 54, of metal, glass, ceramic or hard plastic, is positioned in enlarged bore 48 and is arranged for valving movement toward and away from the frusto-conical valving seat 50. Screw-threaded into bore 48 is a headed adjusting screw 56 having a tip 58 of reduced radial dimension which cooperates with valving ball 54. The head of adjusting screw 56 is located in an enlarged recess 60 defined in the second coupling member 38.

It will be noted that the adjusting screw 56 is arranged to be selectively moved toward and away from valving seat 50 so as to move the valving ball 54 relative to the valving seat 50. The size of the cooperating threads on adjusting screw 56 and in enlarged bore portion 48 are so selected that the cooperation between the said screw threads does not serve as a total barrier to the passage of oxygen, but permits of seepage of oxygen between the screw threads so as to supply oxygen at reduced pressure to the flexible tube 44. The combination of the valving ball 54 and its spacing from frusto-conical valving seat 50, and the operation of the said screw-thread-valving means provides a very excellent pressure-reducing control for the high-pressure-oxygen in cylinder 16 as it bleeds to the diffuser 46 at the end of flexible tube 44.

The arrangement of parts is such that permits of very simple and efficient cleaning of the pressure-reducing and oxygen-metering device herein disclosed. All that is necessary is to separate the coupling members 30 and 38 and remove the adjusting screw 56 and the valving ball 54, thereby providing access to all flow surfaces and permitting of ready removal of all restricting debris on such surfaces. The arrangement also permits the parts to be readily re-assembled and re-set to a position for delivering oxygen at a desired rate. By tightening up on the adjusting screw 56, one may easily, in the field, determine when the valving ball 54 is seated against valve seat 50, and then by backing off the screw a predetermined angular rotation, the metering means may be set to deliver oxygen at a selected rate. Thereafter, recoupling of the members 30 and 38 effects complete re-assembly of the device, and it will be seen that when so re-assembled, the setting of the adjusting screw 56 is protected from inadvertent movement.

From the foregoing, it will be seen that there has been provided a simple adjusting type oxygen-metering device for use with an oxygen aerator for minnow buckets and the like, which adjustable metering device is inexpensive, accurate in operation, simple to calibrate at the point of manufacture, and may be disassembled by the consumer, as desired, for periodic cleaning, and the consumer may reassemble the adjusting metering device by steps which permit him to readily calibrate the metering device to its original calibration point, without the use of expensive supplementary equipment. The dividends accruing from such a device are manifest.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What I claim as new, and desire to secure by Letters Patent of the United States, is:

A pressure-reducing, oxygen-metering device for a bait-bucket aerator which includes oxygen-supplying means for providing oxygen at relatively high pressure and a tubular gas-discharge means for finely diffusing oxygen therefrom at relatively low pressure; said oxygen-metering device comprising, in combination: a first annular coupling member adapted for connection to a relatively-high-pressure supply of oxygen; a second annular coupling member defining a recess therein enlarged relative to the central opening of said first coupling member, said second coupling member being detachably coupled to said first coupling member and adapted for delivering relatively-low-pressure oxygen to a diffuser therefor; and selectively adjustable valving means positioned between said first and second coupling members and arranged to permit of access to said valving means for removing and cleaning of the parts of said valving means when said coupling members are selectively separated, said valving means being operative to effect pressure reduction and rate-of-delivery control between a relatively-high-pressure supply of oxygen and a relatively-low-pressure oxygen diffuser, said selectively adjustable valving means including a frusto-conical valve seat formed in said first coupling member, said valve seat facing downstream and merging with an elongated threaded bore of substantially the same diametral dimension as the maximum dimension of said valve seat, a valving ball in said elongated bore positioned for movement toward and away from said valve seat, and an elongated adjusting screw separate from said valving ball and located in said elongated bore with a control head on said screw spaced downstream of the first coupling member and located in said recess defined in the second coupling member, said adjusting screw being arranged to selectively move said valving ball relative to said valve seat, and the screw thread connection between said adjusting screw and said bore permitting only seepage of oxygen therethrough and also acting as pressure-reducing means.

References Cited in the file of this patent
UNITED STATES PATENTS

| | | |
|---|---|---|
| 196,489 | Shepard | Oct. 23, 1877 |
| 1,492,203 | Chubrich | Apr. 29, 1924 |
| 2,078,567 | Foregger | Apr. 27, 1937 |
| 2,598,961 | Andrus | June 3, 1952 |
| 2,851,241 | Wallgren | Sept. 9, 1958 |